Patented Oct. 14, 1941

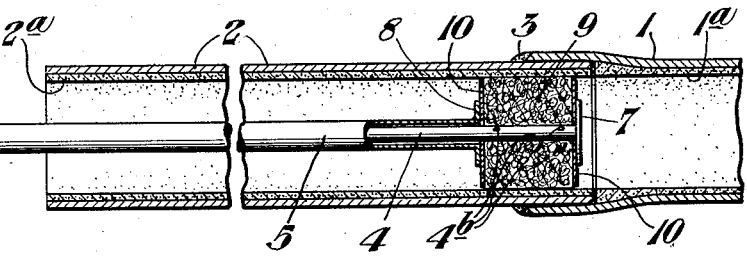
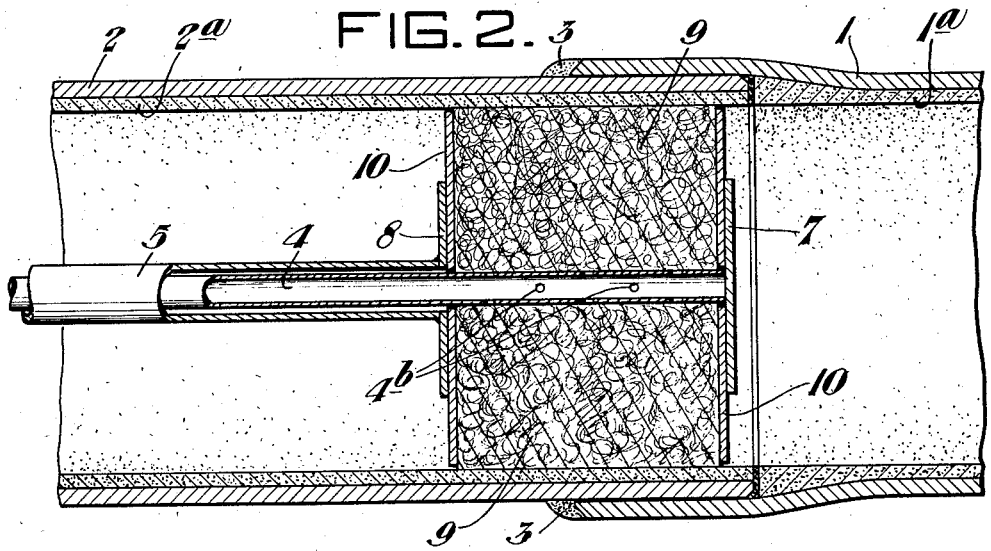
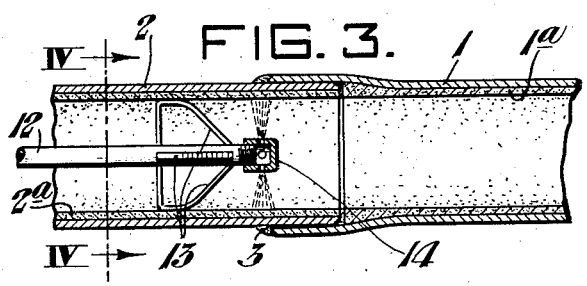
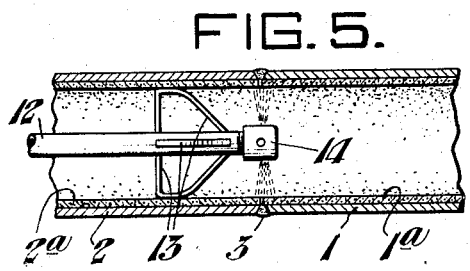

2,259,367

UNITED STATES PATENT OFFICE 2,259,367

APPARATUS FOR COOLING PIPE INSIDES

Paul C. Ely and John M. Hopkins, McKeesport, Pa., assignors to National Tube Company, a corporation of New Jersey Application March 8, 1939, Serial No. 260,666

2 Claims. (Cl. 113—98)

This invention is concerned with welding metal pipes having insides which might be damaged by the welding heat. An example of this is the circumferential interwelding of the ends of cement lined pipes, the welding heat being apt to cause disintegration or spalling of the cement linings.

Specific examples of the invention are illustrated by the accompanying drawing in which:

Figure 1 is a sectional view showing one example used during the interwelding of the ends of cement lined pipe;

Figure 2 is an enlargement taken from Figure 1;

Figure 3 is a second example used for the same purpose as the first example;

Figure 4 is a cross section taken from the line IV—IV in Figure 3; and,

Figure 5 shows the second example used when the pipe ends are joined by a butt weld.

More specifically, these drawings show the belled end of a cement lined pipe 1 being welded to the outside of the spigot end of a second cement lined pipe 2, the deposited welding metal being indicated at 3. The cement linings 1a and 2a of these cement lined pipe sections should not be subjected to extreme heat, such as the welding heat that will be conducted through the pipe 2 to its cement lining 2a opposite the welding metal 3 deposited during the welding.

In the case of the first example, the invention consists of a tool or apparatus having a handle of sufficient length to extend from end-to-end of the pipe section 2 and to project beyond the free end of the latter. This handle consists of inner and outer pipes 4 and 5, respectively, its manipulating or outer end being provided with a handle coupling 6 engaging the pipe 5 and in screw-threaded engagement with the pipe 4, rotation of this coupling causing relative reciprocation of the two pipes. The inner or working ends of the two pipes comprising the handle are provided with flanges 7 and 8, the pipe 4 being of sufficient length to position these flanges in spaced relation. A cartridge 9 is positioned between the flanges 7 and 8.

This cartridge 9 consists of a liquid-absorbing mass of deformable material, such as cotton waste or sponge material. Preferably disks 10 of rigid material are positioned on both sides of this deformable mass, these disks having diameters substantially the same as the inside diameter of the pipe or, in other words, the same diameter as the diameter of the cement lining 2a. These disks 10 are engaged by the flanges 7 and 8, and operation of the coupling 6 causing the flanges to be forced together, causes deformation of the cartridge.

In operation, the cartridge 9 is soaked with water or other convenient cooling liquid and, by means of the handle consisting of the pipes 4 and 5, is inserted inside the pipe to a position opposite the circumferential lining of the welding. Then, as welding proceeds, the coupling 6 is manipulated to cause deformation of the cartridge and a consequent expulsion of the water, the latter serving to cool the cement lining.

To provide additional cooling fluid during welding, the pipe 4 has an upstanding extension 4a provided at its top with a funnel 11, the other end of the pipe 4 which passes through the cartridge 9, the latter surrounding the pipe 4 between the flanges 7 and 8, being provided with holes 4b through which water poured into the funnel 11 may emerge and be absorbed by the cartridge 9. This effect is secured by operating the coupling 6 to release the pressure on the cartridge and to then subsequently compress the cartridge. The operation may be repeated as often as is considered necessary to keep the pipe lining properly cooled.

When water under pressure is available, a different form of tool or apparatus may be used, this being illustrated through Figures 3, 4 and 5 and consisting simply of a pipe 12 having radial legs 13 on its working end, which serve to position this end axially of the pipe. A radial spray nozzle 14 is fixed to the pipe 12 beyond the legs 13, this nozzle serving to create a radial spray directed against the pipe lining when the pipe 12 is supplied by way of its free or manipulating end.

Figure 5 of the drawing shows this second example in use when the pipe ends are joined by a butt joint, Figures 3 and 4 showing it in use with a bell and spigot joint. The first example may also be used when the pipes are buried together.

We claim:

1. Apparatus for cooling the inside of a pipe, comprising spaced disks having outside contours fitting the inside of the pipe, a liquid-absorbing mass of deformable material between said disks, a handle for inserting said disks and mass into the inside of the pipe, and means operable from the manipulating end of said handle for forcing said disks together to cause deformation of said mass therebetween.

2. Apparatus for cooling the inside of a pipe, comprising spaced disks having outside contours fitting the inside of the pipe, a liquid-absorbing mass of deformable material between said disks, a handle for inserting said disks and mass into the inside of the pipe, and means operable from the manipulating end of said handle for forcing said disks together to cause deformation of said mass therebetween, said handle and said means comprising a pipe extending through said mass and connecting with the remote one of said disks, said pipe having openings communicating with said mass, and a pipe inside which the first-named pipe reciprocates and which connects with the other of said disks, the first-named pipe being adapted to receive cooling liquid for ejection into said mass and relative reciprocation of said pipes causing deformation of said mass and extrusion of the liquid therefrom in radial paths defined by said disks.

PAUL C. ELY.
JOHN M. HOPKINS.